United States Patent [19]

Janson

[11] Patent Number: 4,648,283
[45] Date of Patent: Mar. 10, 1987

[54] GEAR SHIFT CONTROL MECHANISM

[75] Inventor: David A. Janson, Plymouth, Mich.

[73] Assignee: Ford Motor Company, Dearborn, Mich.

[21] Appl. No.: 678,532

[22] Filed: Dec. 5, 1984

[51] Int. Cl.⁴ .......................... G05G 5/10; G05G 9/12
[52] U.S. Cl. ........................................ 74/477; 74/475
[58] Field of Search ..................... 74/473 R, 475, 477

[56] References Cited

U.S. PATENT DOCUMENTS

| | | | |
|---|---|---|---|
| 911,419 | 2/1909 | Marmon | 74/477 X |
| 1,736,330 | 11/1929 | Schmidt | 74/477 |
| 2,493,592 | 1/1950 | Peabody | 74/477 |
| 2,951,392 | 9/1960 | Backus | 74/473 R |
| 3,602,060 | 8/1971 | Magg | 74/477 |
| 3,765,261 | 10/1973 | Hobbins | 74/477 |
| 3,902,378 | 9/1975 | Osborn | 74/475 |
| 3,994,184 | 11/1976 | Osborn | 74/473 R |
| 4,048,869 | 9/1977 | Johnson | 74/471 R |
| 4,277,983 | 7/1981 | Izumi et al. | 74/477 |

FOREIGN PATENT DOCUMENTS

| | | | |
|---|---|---|---|
| 353246 | 5/1922 | Fed. Rep. of Germany | 74/477 |
| 252291 | 5/1926 | United Kingdom | 74/477 |

Primary Examiner—Allan D. Herrmann
Attorney, Agent, or Firm—Frank G. McKenzie; Donald J. Harrington

[57] ABSTRACT

A gear shift control mechanism for a manual transmission having multiple shift rails slideably mounted on the transmission casing and carrying shift forks for moving synchronizer clutches into engagement with the gears of the various speed ratios of the transmission includes a shift lever supported pivotally for movement both parallel to the axis of the shift rods and perpendicular to the axis of the shift rods. Pivotal movement to the shift rods brings interlock flanges into engagement with the shift forks that are not selected for engagement by the vehicle operator and prevent these shift forks from moving. When certain selected shift forks are engaged, spring arms resiliently bias the shift assembly toward the three-four shift plane. Pivotal movement of the assembly in one angular direction is limited in one plane by bearing contact between the shift lever and the interlock flanges and in the other plane by contact between the interlock flanges and the outer surface of the shift forks. The position of the shift lever is maintained by a detent formed within the interlock mechanism.

14 Claims, 6 Drawing Figures

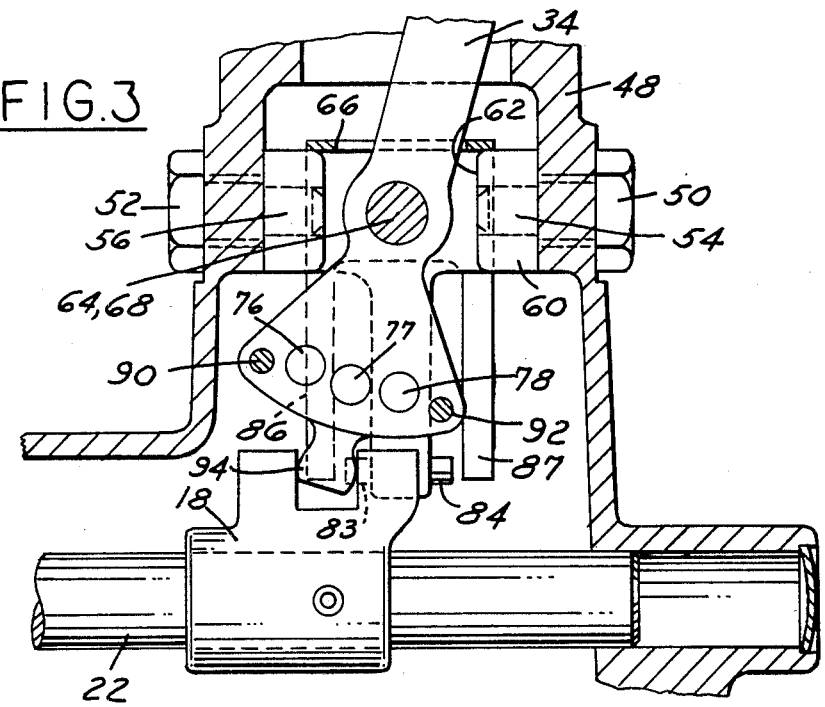
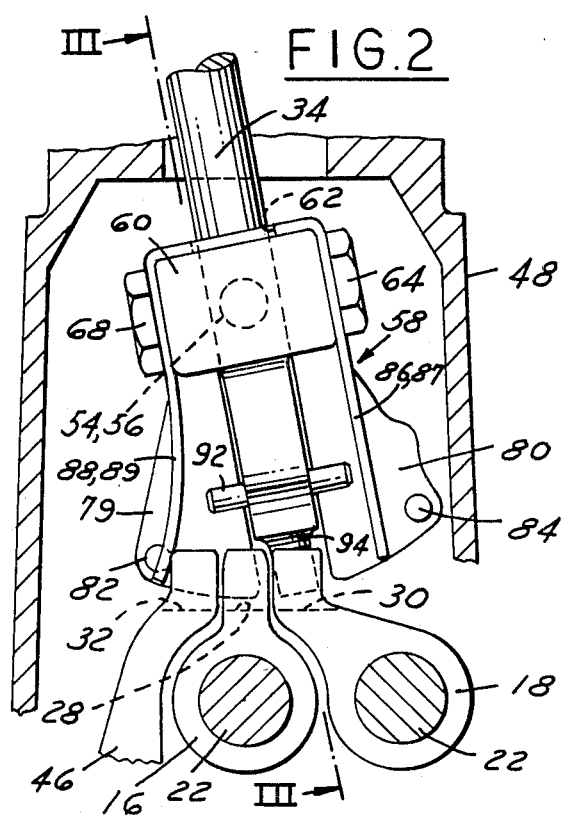

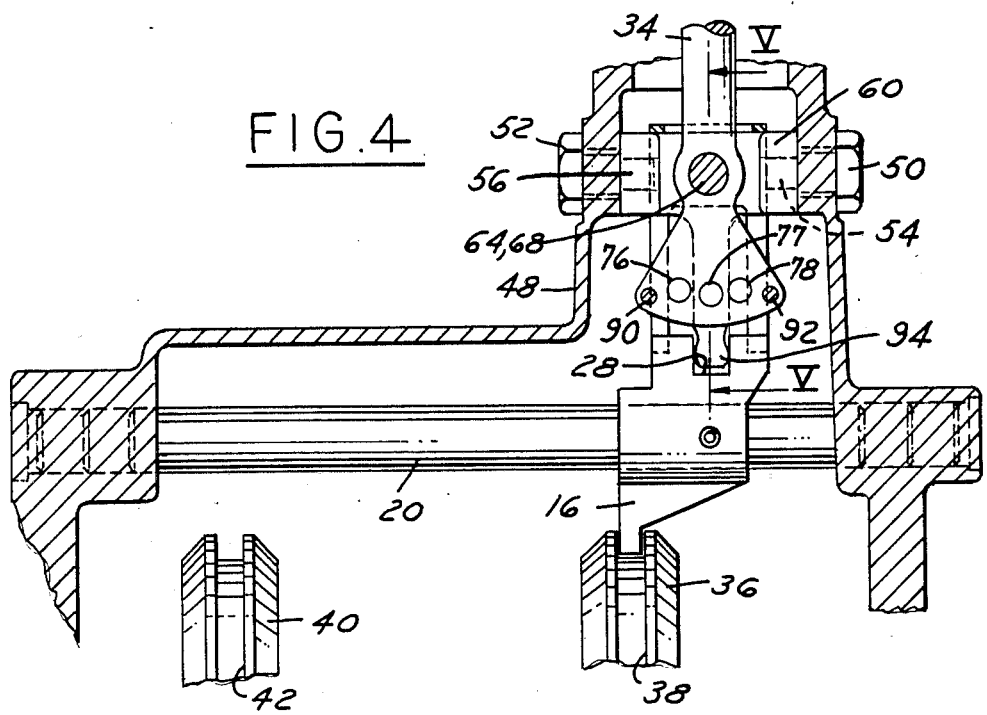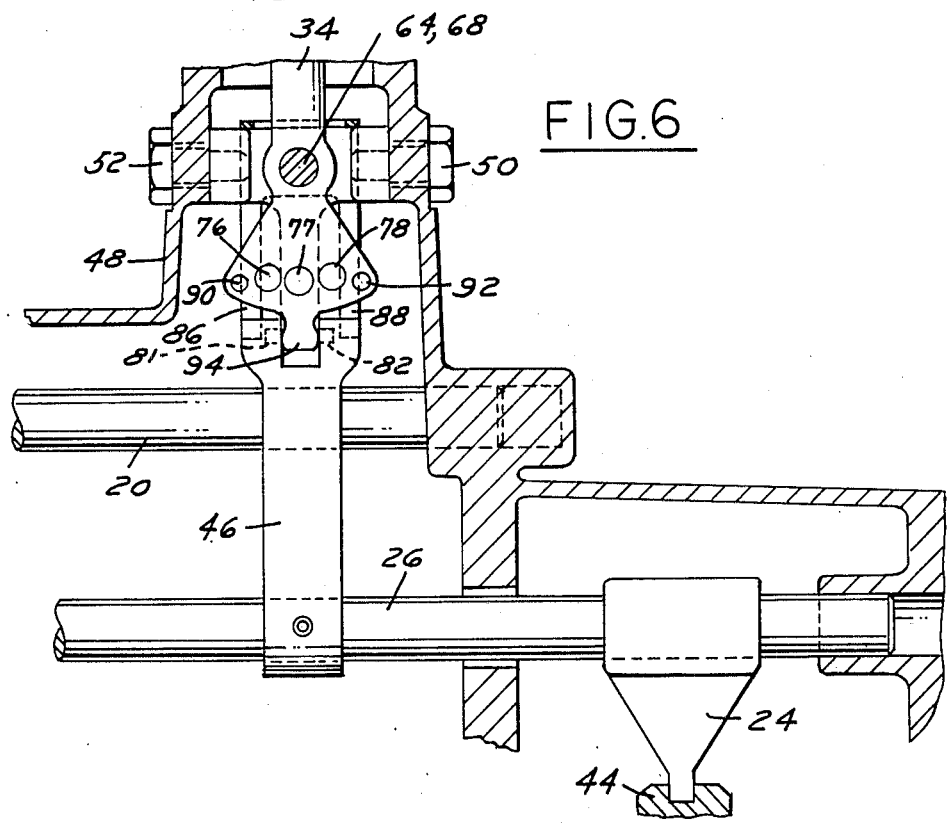

GEAR SHIFT CONTROL MECHANISM

BACKGROUND OF THE INVENTION

1. Field of the Invention

This invention relates to a gear shift control mechanism for a multiple speed transmission having several shift rods which move axially to produce changes in the ratio of the input speed to the output speed. More particularly, the invention relates to an articulated shift lever for moving any one of the shift rods and an interlock for preventing the unselected shift rods from moving.

2. Description of the Prior Art

Multiple speed manual transmissions, particularly those having more than three forward speed ratios and one reverse drive ratio require a shift mechanism capable of effecting all of the required shifts with a manual shift pattern that is easy for the vehicle operator to follow. A transmission of this type generally has multiple shift rails mounted slideably on the transmission casing and carrying shift forks, which move synchronizer clutches to driveably connect a gear element of the selected gear ratio to the shaft on which it is journalled, usually either the countershaft or the output shaft. In transmissions of this type, the gear shift lever is usually mounted by a universal ball joint on an extension housing from which the shift rails extend forward to the synchronizers and shift forks. Generally, some form of interlock mechanism is provided that permits the selected shift rod to move as the shift lever is rotated and positively prevents movement of the shift rods other than the one selected by the vehicle operator. Usually the shift rails are each provided with detents that establish and maintain their positions among a neutral position, a forward position and a rearward position. Some means is required also to fix the path of travel of the gear shift lever and to maintain its position at a neutral position or a drive position. A detent, other than the shift rail detents, is usually provided to fix and maintain the position of the gear shift lever in the plane of the shift rails. Usually, there is a preferred neutral position to which the gear shift lever is continuously biased by a coiled spring.

In a top shift manual transmission, the shift rails are usually arranged directly below the universal ball joint connection that supports the gear shift lever on the transmission casing. Although the distance through which movement of the gear shift lever is transferred by the shift rails to the synchronizer sleeves and to the interlock mechanism is short in the top shift transmission, nevertheless the need for multiple detents on each of the shift rails and for some means to hold the gear shift lever engaged with the selected former shift fork is required.

SUMMARY OF THE INVENTION

It is an object of the present invention to provide a shift control mechanism for a multiple speed manual transmission that includes a gimbaled shift lever-for selecting and moving several shift rods between drive positions and a neutral position and in which the shift lever can be moved in only one plane at a time in the forward and rearward direction.

A further object of this invention is to provide, in a compact assembly having a minimum number of parts, such a shift mechanism that includes means for defining the axes about which the shift lever can rotate and means for limiting the range of angular movement of the shift lever with respect to these axes. This shift control mechanism includes an interlock, which automatically, i.e., without conscious effort by the operator, prevents unselected shift rails from moving from their neutral positions when the shift lever moves a selected shift rail between its neutral position and the drive positions.

The detent provisions in manual transmission have generally required at least three detent grooves on each of the shift rails and spring biased detent balls retained in a transmission casing to engage the shift rail detent grooves. In the shift mechanism of the present invention, a single detent mechanism, formed on the shift lever and retained in the interlock mechanism, avoids the need for separate detents on each of the shift rails and a separate detent for holding the shift lever in position.

Furthermore, the gear shift mechanism according to this invention has an integrally formed spring for biasing the shift lever toward the three-four shift plane away from the one-two plane and the five-reverse plane. This biasing action produces an increased force on the shift lever that is sensed by the vehicle operator whenever the shift lever is moved to the shift plane that contains the reverse gear. This increased force acts as a warning to the operator that reverse gear engagement is being attempted.

In realizing these and other objects and advantages, the gear shift control mechanism according to the present invention includes multiple shift rails that are directed substantially parallel to one another, each shift rail carrying a shift fork that engages the sleeve of a synchronizer clutch and defines a recess engageable by the lower end of the gear shift lever. The shift lever is supported for pivotal movement about an axis that is substantially parallel to the axes of the shift rods and for pivotal movement about an axis that is substantially perpendicular to the axes of the shift rods.

The shift control further includes an interlock mechanism having flanges that rotate with the shift lever into engagement with the recesses on the shift forks to prevent movement parallel to the axis of the shift rails. When the gear shift lever is pivoted, sheet metal legs, which extends downwardly from the pivotal support of the gear shift lever toward the shift fork recesses bring surfaces on opposite lateral sides of the shift lever into engagement with the upper end of the shift forks as the shift lever is moved into contact with the recess of the selected shift fork. When this contact is made, the spring legs are bent and develop on the spring legs a force tending to restore the shift lever and the interlock mechanism to a vertical position and into engagement with the shift fork on the centrally located shift rail.

The interlock flanges carry stop members in the form of pins that rotate with the shift lever and the interlock mechanism alternately into engagement with the surfaces of the shift fork as the shift lever is rotated from the central plane. This contact limits the angular movement of the gear shift lever in the plane that is perpendicular to the axes of the shift rails. The shift lever also carries stop surfaces in the form of pins that extend transversely and are adapted to be brought into engagement with forward and rear faces of the interlock flanges as the shift lever is rotated in a plane parallel to the axis of the shift rails. These latter stop surfaces define a range of angular motion in that plane.

BRIEF DESCRIPTION OF THE DRAWINGS

FIG. 2 is a cross section through the shift module showing the shift lever located in the one-two plane.

FIG. 3 is a cross section taken at plane III—III of FIG. 2.

FIG. 4 is a side elevation of the shift mechanism, partially in cross section, of the shift module taken in the plane that contains the three-four shift rail.

FIG. 6 is a side elevation of the shift mechanism partially in cross section in the plane that contains the five-reverse shift rail.

DESCRIPTION OF THE PREFERRED EMBODIMENTS

Figure 5:
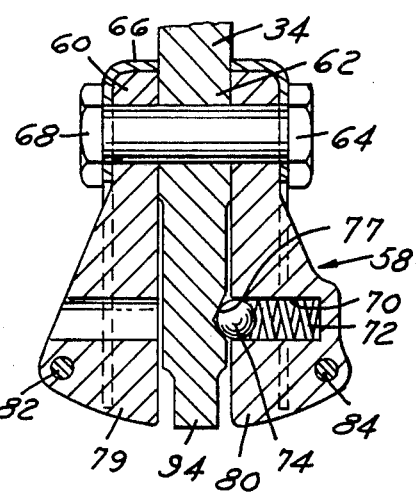
FIG. 5 is a cross section taken at plane V—V of FIG. 4.

A manual countershaft transmission for use with the shift mechanism of this invention includes an output shaft 12 and a countershaft 14 rotatably supported on the transmission casing. These shafts carry multiple pairs of output gears and pinions, respectively, by means of which the various gear ratios of the transmission are produced. The output shaft also carries multiple synchronizer clutches, which selectively connect the output gears for the four lowest speed ratios to the output shaft. The synchronizer clutch sleeves for the synchronizer clutches mounted on the output shaft are moved forward and rearward by shift forks 16, 18 slideably mounted on shift rails 20, 22, respectively. A third shift fork 24 carried on a third shift rail is slideably mounted so that it moves the clutch sleeve of a third synchronizer clutch carried on countershaft 14. A shift arm 46 fixed to rail 26 extends upward toward the shift lever and connects the lever to fork 24. The shift rails 20, 22, 26 are substantially mutually parallel and are slideably supported on the transmission casing.

The shift forks 16, 18 and arm 46 are mechanically connected to the respective shift rails and each has a recess 28, 30, 32, respectively, that can be engaged by the lower portion of the gear shift selector lever 34.

For example, as FIG. 4 shows, the 1-2 synchronizer clutch sleeve 36, whose movement produces the first and second speed ratios, has a recess 38 on its outer surface that is engaged by the fingers of shift fork 16 and a recess 28 located above shift rail 20 for engagement by the gear selector lever 34. Similarly, the 3-4 synchronizer clutch sleeve, mounted on the three-four shift rail 22, shown in FIG. 3, has a recess 42 on its outer surface that can be engaged by the fingers of shift fork 18. The five-reverse synchronizer clutch sleeve 44 has a recess formed on its outer surface that is engageable by the fingers of the 5-R shift fork 24 carried on the associated shift rail 26. FIG. 6 shows that 5-R shift rail 26 carries shift fork 24 and arm 46, which is mechanically attached to the shift rail, extends upward toward the gear shift selector lever 34 and provides a recess 32 into which the selector lever can be fitted selectively.

Formed integrally with the transmission casing, is a shift selector module housing 48, which provides a pivotal support substantially parallel to the axes of the shift rails about the axis of pivot pins 50, 52. These pins engage screw threads formed in the forward and rear walls of the shift module housing and provide cylindrical surfaces 54, 56 on which the shift lever 34 pivot into engagement with recesses 28, 30, 32.

The gear selector includes an interlock mechanism 58 in the form of a block 60 whose upper portion surrounds the shift lever 34 and defines an opening 62 through which lever 34 extends downwardly into the transmission housing. A bolt 64, whose axis is substantially perpendicular to the axes of the shift rails, extends through aligned holes in the shift lever, interlock block 60 and the sheet metal channel 66 to engage nut 68. Bolt 64 provides a cylindrical surface on which lever 34 pivots in a plane parallel to the axes of the shift rails and relative to the interlock mechanism 58. The lower portion of block 60 includes a detent hole 70 that extends partially through the lateral thickness of the block and receives a helical spring 72, which resiliently forces a ball 74 against the adjacent surface of shift lever 34. The surface of lever 34 that is adjacent the detent ball 74 has three right circular conical depressions 76, 77, 78, which are adapted to receive detent ball 74 and hold lever 34 in position due to the force of compression spring 72. The lower end of block 60 includes flanges 79, 80 that are sized to fit within recesses 28 and 30 on shift forks 16 and 18 and into recess 32 on shift arm 46.

Flange 79 carries at its radially outer end a spline directed parallel to the axis of the shift rails having an end 81 that extends forward and an end 82 that extends rearward from opposite surfaces of the flange. Flange 80 carries a pin at its radially outer end having an end 83 directed forward and an end 84 directed rearward from opposite faces of the flange.

The sheet metal channel 66 is supported on the upper surface of block 60 and extends downward on both lateral sides of the gear shift lever 34 beyond the upper surface of the shift forks 16 and 18 and the upper surface of arm 46. Channel 66 has on one lateral side of lever 34 a forward leg 86 and a rearward leg 87, which bear against the lateral surfaces of shift fork 18, and on the opposite lateral side of the lever a forward leg 88 and a rearward leg 89, which bear against the lateral surface of arm 46, as the interlock mechanism pivots about the axis of pins 52, 54.

Located at the lower end of shift lever 34 on a circular arc having a radius extending from the axis of bolt 64 is a forward pin 90 and a rearward pin 92, which are adapted to contact the forward and rearward faces, respectively, of blocking flanges 79, 80, as the shift lever rotates about the axis of bolt 64.

In order to select the various forward speed ratios and reverse drive gear shift lever 34 is pivoted on surfaces 54 and 56 in a plane perpendicular to the axes of the shift rails so that the selector finger 94 on lever 34 engages either recess 28 of the three-four shift fork 16, recess 30 of the one-two shift fork 18 or recess 32 of the five-reverse shift arm 46. Then the shift lever 34 is pivoted about the axis of bolt 64 in a plane parallel to the axes of the shift rails so that the selected shift fork is moved either forward or rearward.

FIG. 2 shows selector finger 94 fitted within recess 30 of the shift fork 18. When the shift lever is moved to this position, spring legs 88 and 89 bear resiliently on the outer surface of shift arm 46 and deflect due to this contact from the position they had previously occupied, the position shown in FIG. 1. Contact between the spring legs and the outer surface of arm 46 produces a force on the shift lever and the interlock mechanism 58 tending to rotate the assembly clockwise. When selector finger 94 is located within recess 30, interlock flange 79 enters recesses 32 and 28 and the forward and rearward ends 81, 82 of the pin carried by flange 79 move into contact with the outer surface of shift arm 46 thereby preventing further counterclockwise rotation of the assembly about the axis of pins 50, 52.

Next, the shift lever is rotated about the axis of bolt 64 clockwise to the position shown in FIG. 3 where shift fork 18 and shift rail 22 are moved forward in the transmission casing, thereby causing the one-two synchronizer clutch to produce synchronism with, and to engage, the second forward speed ratio output gear and to connect that gear to the output shaft. When the shift mechanism is moved to this position, the surface of pin 92 carried on the shift lever moves into contact with the rear faces of interlock flanges 79 and 80, thereby preventing further clockwise rotation of the shift lever about the axis of bolt 64. Alternatively, the shift lever can be rotated counterclockwise past the neutral position to the first-speed ratio position where shift fork 18 and shift rail 22 are moved rearward, thereby causing the one-two synchronizer to produce synchronism with the first speed ratio output gear and to connect that gear to the output shaft. When the shift mechanism is moved to the first speed ratio position, the surface of pin 90 carried on the lower end of the shift lever moves into contact with the forward face of interlock flanges 79 and 80, thereby preventing further counterclockwise rotation of shift lever 34 about the axis of bolt 64. Shift arm 46 and shift fork 16 are prevented from moving as shift fork 18 and shift rail 22 are moved forward and rearward because interlock flange 79 is fitted within the recesses 32 and 28.

Figure 1:
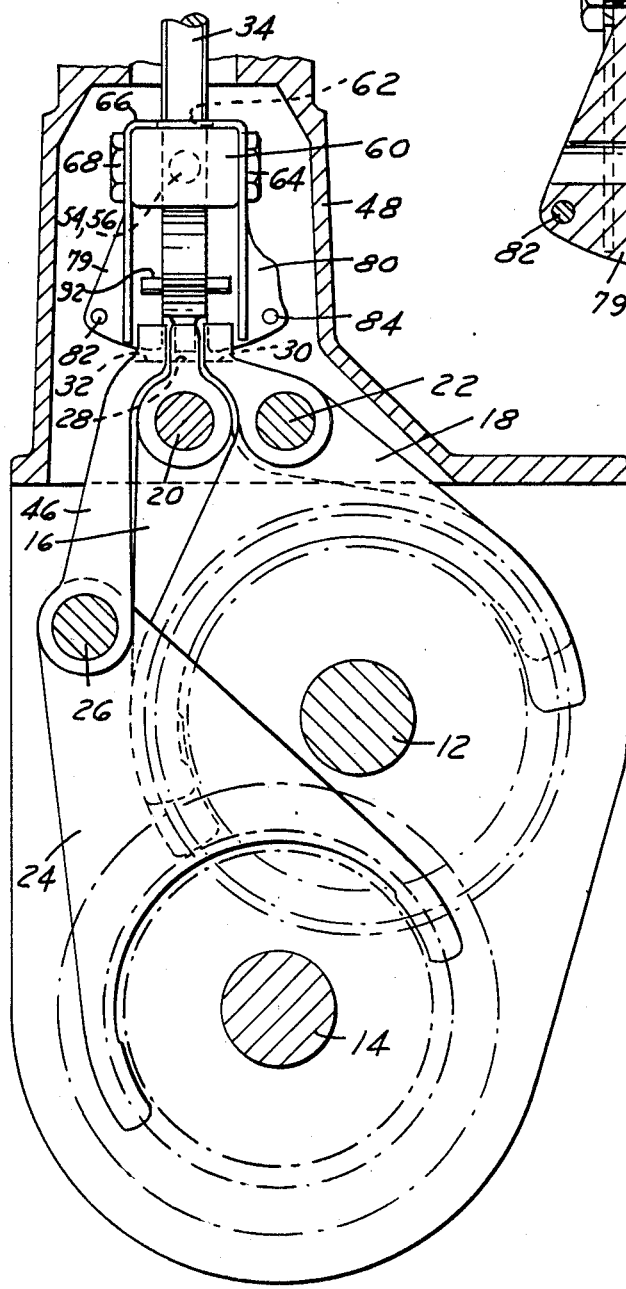
FIG. 1 is a cross section through a transverse plane of a manual transmission with which the shift mechanism of this invention is used.

Shifts between the third and fourth forward speed ratios are made when the shift lever and interlock mechanism are pivoted about the axis of surfaces 54 and 56 to the position shown in FIG. 1. In this position, the selector finger 94 moves into recess 28 of the three-four shift fork 16, interlock flange 79 enters recess 32 of the five-reverse shift arm 46 and interlock flange 80 enters recess 30 of the one-two shift fork 18. When shift lever 34 is pivoted clockwise, when viewed as in FIG. 4, shift fork 16, shift rail 20 and synchronizer sleeve 36 are moved forward within the transmission casing and cause the fourth forward speed gear to be driveably connected to the output shaft. The third speed ratio is produced when shift lever 34 is rotated counterclockwise, thereby moving the shift fork 16, shift rail 20 and synchronizer sleeve rearward and driveably connecting the third forward speed ratio gear to the output shaft. The interlock flanges prevent shift arm 46 and shift fork 18 from moving as the shift lever is pivoted in a plane parallel to the axis of the shift rails. Again, pins 90 and 92 are brought into contact with the forward and rear faces, respectively, of the interlock flanges as the shift lever is rotated counterclockwise and clockwise, respectively, thereby limiting the range of rotation of the lever about the axis of bolt 64.

Shift arm 46, shift rail 26, shift fork 24 and the sleeve 44 of the five-reverse synchronizer are moved forward and rearward in order to connect a component of the fifth forward speed ratio or the reverse drive gearset to the output shaft in accordance with counterclockwise and clockwise rotation of shift lever 34 (when viewed as shown in FIG. 6). When selector finger 94 is rotated into recess 32, interlock flange 80 enters recesses 28 and 30 and prevents movement of shift forks 16 and 18. When the shift lever is moved to the five-reverse plane, the legs 86, 87 of the spring member are brought into contact with the outer surface of shift fork 18, thereby producing a force tending to rotate the shift mechanism clockwise when viewed as shown in FIG. 2 about the axis of surfaces 54, 56. When selector finger 94 enters recess 32, pin 83-84 is brought into contact with the outer surface of shift fork 18 and prevents further clockwise rotation of the assembly on surfaces 54 and 56.

Pins 90 and 92 limit the range of rotation about the axis of bolt 64. The various components of the shift mechanism are releasably held in the neutral position shown in FIG. 4, the forward position shown in FIG. 3 and in the rearward position due to the effect of the compression spring 72 that holds the detent ball in contact with the surfaces of the depressions 76–78.

Having described preferred embodiments of my invention, what I claim and desire to secure by U.S. Letters Patent is:

1. A gear shift control mechanism comprising:
  multiple shift rods directed substantially parallel to one another, each rod carrying a shift fork for axial movement;
  a shift lever supported for pivotal movement about a first axis directed parallel to the axes of the shift rods and for pivotal movement about a second axis directed substantially perpendicular to the axes of the shift rods, said lever being moveable about said first axis and said second axis into engagement with a selected shift fork;
  interlock means located on each lateral side of the shift lever and mounted for pivotal movement about said first axis for blocking engagement with the shift forks;
  detent means for holding the shift lever in multiple predetermined angular positions about the second axis; and
  spring means located on a lateral side of the shift lever and mounted for pivotal movement about the first axis into interference contact with the shift forks for producing a force tending to resiliently bias the shift lever out of engagement with the selected shift fork.

2. A gear shift control mechanism comprising:
  multiple shift rods directed substantially parallel to one another, each rod carrying a shift fork for axial movement;
  a shift lever supported for pivotal movement about a first axis directed parallel to the axes of the shift rods and for pivotal movement about a second axis directed substantially perpendicular to the axes of the shift rods, said lever being moveable about said first axis and said second axis into engagement with a selected shift fork;
  interlock means located on each lateral side of the shift lever and mounted for pivotal movement about said first axis into blocking engagement with the shift forks; and
  spring means located on a lateral side of the shift lever, mounted for pivotal movement about the first axis into interference contact with the shift forks for producing a force tending to resiliently bias the shift lever out of engagement with the selected shift fork.

3. The control mechanism of claim 2 further comprising means located on each lateral side of the shift lever and mounted for pivotal movement with the shift lever about said first axis into contact with the shift forks for limiting the range of pivotal movement of the shift lever about the first axis.

4. The control mechanism of claim 2 further comprising means carried on the shift lever, located at the front and rear sides of the interlock means, mounted for pivotal movement about said second axis into contact with the interlock means for limiting the range of pivotal movement of the shift lever about the second axis.

5. The control mechanism of claim 2 further comprising means located on each lateral side of the shift lever and mounted for pivotal movement with the shift lever about said first axis into contact with the shift forks for limiting the range of pivotal movement of the shift lever about the first axis; and means carried on the shift lever, located at the front and rear sides of the interlock means, mounted for pivotal movement about said second axis into contact with the interlock means for limiting the range of pivotal movement of the shift lever about the second axis.

6. A gear shift control mechanism comprising:
multiple shift rods directed substantially parallel to one another, each rod carrying a shift fork for axial movement;
a shift lever supported for pivotal movement about a first axis directed parallel to the axes of the shift rods and for pivotal movement about a second axis directed substantially perpendicular to the axes of the shift rods, said lever being moveable about said first axis and said second axis into engagement with a selected shift fork;
interlock means located on each lateral side of the shift lever and mounted for pivotal movement about said first axis into blocking engagement with the shift forks; and
means located on each lateral side of the shift lever and mounted for pivotal movement with the shift lever about said first axis into contact with the shift forks for limiting the range of pivotal movement of the shift lever about the first axis.

7. The control mechanism of claim 6 further comprising means carried on the shift lever, located at the front and rear sides of the interlock means, mounted for pivotal movement about said second axis into contact with the interlock means for limiting the range of pivotal movement of the shift lever about the second axis.

8. A gear shift control mechanism comprising:
multiple shift rods directed substantially parallel to one another, each rod carrying a shift fork for axial movement;
a shift lever supported for pivotal movement about a first axis directed parallel to the axes of the shift rods and for pivotal movement about a second axis directed substantially perpendicular to the axes of the shift rods, said lever being moveable about said first axis and said second axis into engagement with a selected shift fork;
interlock means located on each lateral side of the shift lever and mounted for pivotal movement about said first axis into blocking engagement with the shift forks; and
means carried on the shift lever, located at the front and rear sides of the interlock means, mounted for pivotal movement about said second axis into contact with the interlock means for limiting the range of pivotal movement of the shift lever about the second axis.

9. A gear shift control mechanism comprising:
multiple shift rods directed substantially parallel to one another, each rod carrying a shift fork for axial movement;
a shift lever supported for pivotal movement about a first axis directed parallel to the axes of the shift rods and for pivotal movement about a second axis directed substantially perpendicular to the axes of the shift rods, said lever being moveable about said first axis and said second axis into engagement with a selected shift fork;
interlock means located on each lateral side of the shift lever and mounted for pivotal movement about said first axis for block engagement with the shift forks;
detent means for holding the shift lever in multiple predetermined angular positions about the second axis; and
means located on each lateral side of the shift lever and mounted for pivotal movement with the shift lever about said first axis into contact with the shift forks for limiting the range of pivotal movement of the shift lever about the first axis.

10. A gear shift control mechanism comprising:
multiple shift rods directed substantially parallel to one another, each rod carrying a shift fork for axial movement;
a shift lever supported for pivotal movement about a first axis directed parallel to the axes of the shift rods and for pivotal movement about a second axis directed substantially perpendicular to the axes of the shift rods, said lever being moveable about said first axis and said second axis into engagement with a selected shift fork;
interlock means located on each lateral side of the shift lever and mounted for pivotal movement about said first axis for blocking engagement with the shift forks;
detent means for holding the shift lever in multiple predetermined angular positions about the second axis;
spring means located on a lateral side of the shift lever, mounted for pivotal movement about the first axis into interference contact with the shift forks for producing a force tending to resiliently bias the shift lever out of engagement with the selected shift fork; and
means located on each lateral side of the shift lever and mounted for pivotal movement with the shift lever about said first axis into contact with the shift forks for limiting the range of pivotal movement of the shift lever about the first axis.

11. A gear shift control mechanism comprising:
multiple shift rods directed substantially parallel to one another, each rod carrying a shift fork for axial movement;
a shift lever supported for pivotal movement about a first axis directed parallel to the axes of the shift rods and for pivotal movement about a second axis directed substantially perpendicular to the axes of the shift rods, said lever being moveable about said first axis and said second axis into engagement with a selected shift fork;
interlock means located on each lateral side of the shift lever and mounted for pivotal movement about said first axis for blocking engagement with the shift forks;

detent means for holding the shift lever in multiple predetermined angular positions about the second axis; and means carried on the shift lever, located at the front and rear sides of the interlock means, mounted for pivotal movement about said second axis into contact with the interlock means for limiting the range of pivotal movement of the shift lever about the second axis.

12. A gear shift control mechanism comprising:

multiple shift rods directed substantially parallel to one another, each rod carrying a shift fork for axial movement;

a shift lever supported for pivotal movement about a first axis directed parallel to the axes of the shift rods and for pivotal movement about a second axis directed substantially perpendicular to the axes of the shift rods, said lever being moveable about said first axis and said second axis into engagement with a selected shift fork;

interlock means located on each lateral side of the shift lever and mounted for pivotal movement about said first axis for blocking engagement with the shift forks;

detent means for holding the shift lever in multiple predetermined angular positions about the second axis;

spring means located on a lateral side of the shift lever, mounted for pivotal movement about the first axis into interference contact with the shift forks for producing a force tending to resiliently bias the shift lever out of engagement with the selected shift fork; and means carried on the shift lever, located at the front and rear sides of the interlock means, mounted for pivotal movement about said second axis into contact with the interlock means for limiting the range of pivotal movement of the shift lever about the second axis.

13. A gear shift control mechanism comprising:

multiple shift rods directed substantially parallel to one another, each rod carrying a shift fork for axial movement;

a shift lever supported for pivotal movement about a first axis directed parallel to the axes of the shift rods and for pivotal movement about a second axis directed substantially perpendicular to the axes of the shift rods, said lever being moveable about said first axis and said second axis into engagement with a selected shift fork;

interlock means located on each lateral side of the shift lever and mounted for pivotal movement about said first axis for blocking engagement with the shift forks;

detent means for holding the shift lever in multiple predetermined angular positions about the second axis;

means located on each lateral side of the shift lever and mounted for pivotal movement with the shift lever about said first axis into contact with the shift forks for limting the range of pivotal movement of the shift lever about the first axis; and means carried on the shift lever, located at the front and rear sides of the interlock means, mounted for pivotal movement about said second axis into contact with the interlock means for limiting the range of pivotal movement of the shift lever about the second axis.

14. A gear shift control mechanism comprising:

multiple shift rods directed substantially parallel to one another, each rod carrying a shift fork for axial movement;

a shift lever supported for pivotal movement about a first axis directed parallel to the axes of the shift rods and for pivotal movement about a second axis directed substantially perpendicular to the axes of the shift rods, said lever being moveable about said first axis and said second axis into engagement with a selected shift fork;

interlock means located on each lateral side of the shift lever and mounted for pivotal movement about said first axis for blocking engagement with the shift forks;

detent means for holding the shift lever in multiple predetermined angular positions about the second axis;

spring means located on a lateral side of the shift lever, mounted for pivotal movement about the first axis into interference contact with the shift forks for producing a force tending to resiliently bias the shift lever out of engagement with the selected shift fork;

means located on each lateral side of the shift lever and mounted for pivotal movement with the shift lever about said first axis into contact with the shift forks for limiting the range of pivotal movement of the shift lever about the first axis; and means carried on the shift lever, located at the front and rear sides of the interlock means, mounted for pivotal movement about said second axis into contact with the interlock means for limiting the range of pivotal movement of the shift lever about the second axis.

* * * * *